United States Patent [19]

Nishida et al.

[11] Patent Number: 4,996,600
[45] Date of Patent: Feb. 26, 1991

[54] TWO DIMENSIONAL SOLID STATE IMAGE SENSING DEVICE

[75] Inventors: Yasuaki Nishida; Yoshiki Iino; Hiroshi Ohtake; Masahide Abe; Shigeo Yoshikawa, all of Tokyo; Yukio Endo, Yokohama; Yoshiyuki Matsunaga, Kamakura; Nozomu Harada, Yokohama, all of Japan

[73] Assignees: Nippon Hoso Kyokai, Tokyo; Kabushiki Kaisha Toshiba, Kawasaki, both of Japan

[21] Appl. No.: 363,085

[22] Filed: Jun. 8, 1989

[30] Foreign Application Priority Data

Jun. 8, 1988 [JP] Japan .................. 63-139519

[51] Int. Cl.⁵ .............................................. H04N 3/14
[52] U.S. Cl. .......................... 358/213.22; 358/213.29
[58] Field of Search ................... 358/213.22, 213.26, 358/909, 213.29

[56] References Cited

U.S. PATENT DOCUMENTS

| | | | |
|---|---|---|---|
| 4,081,841 | 3/1978 | Ochi et al. ................ | 358/213.22 |
| 4,837,630 | 6/1989 | Ueda ....................... | 358/213.26 |
| 4,839,734 | 6/1989 | Takemura ................. | 358/213.26 |
| 4,897,728 | 1/1990 | Yamada .................... | 358/213.22 |

Primary Examiner—Stephen Brinich
Attorney, Agent, or Firm—Oblon, Spivak, McClelland, Maier & Neustadt

[57] ABSTRACT

A solid state image sensing device comprises a great number of light receiving elements arrayed in rows and columns, a plurality of vertical CCD registers respectively coupled to columns of the light receiving elements for vertically transferring signal charges sensed by the light receiving elements, a horizontal CCD register for horizontally transferring the signal charges transferred from the vertical CCD register, an adder section for adding together signal charges obtained from a predetermined number of light receiving elements arrayed in columns and rows to form one added signal charge and for obtaining a plurality of added signal charges for all the light receiving elements in each of fields, and a field switcher for introducing signal charges obtained from an array of light receiving elements with at least one element shifted from the previous field to the adder section in each field.

15 Claims, 15 Drawing Sheets

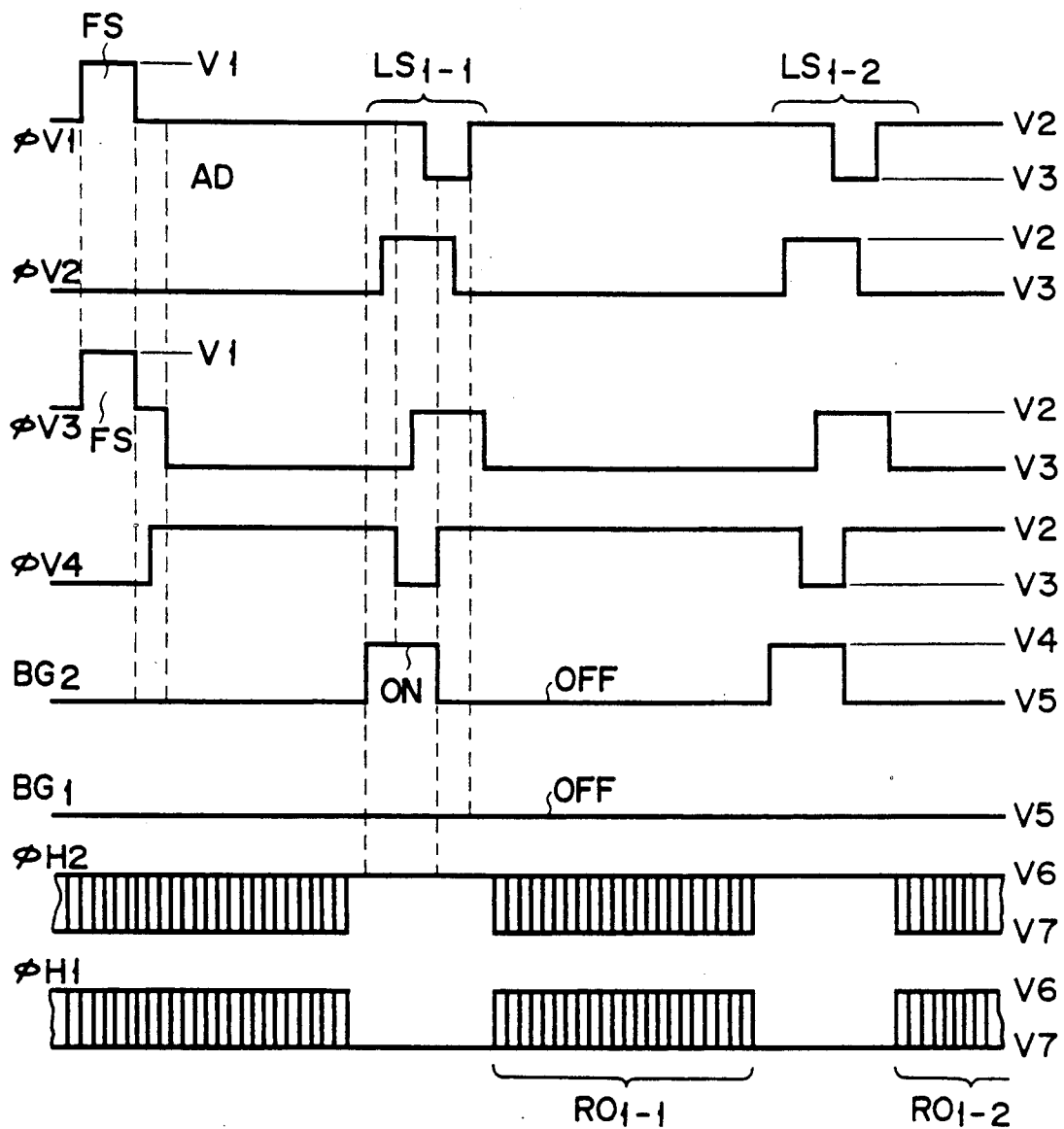
F I G. 4

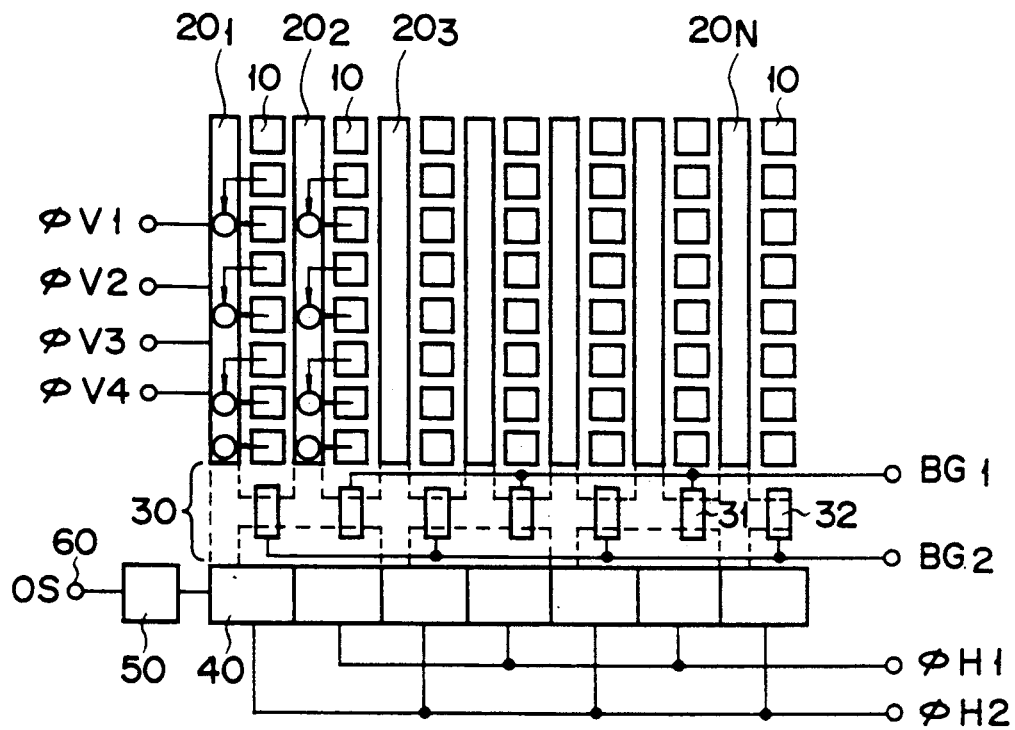
F I G. 6A
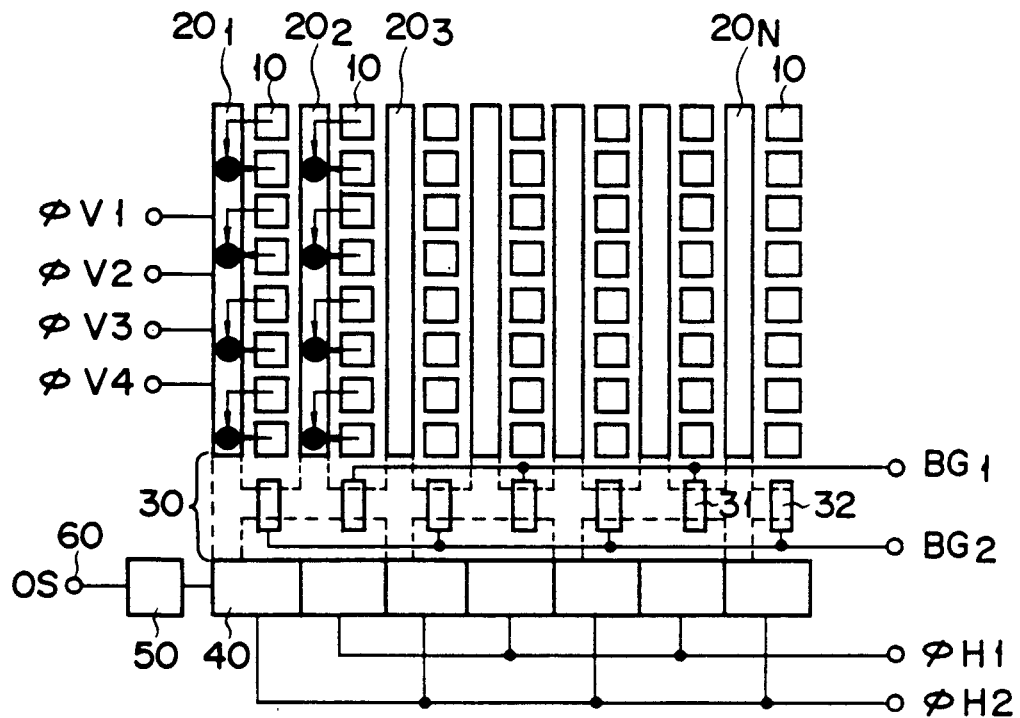
F I G. 6B

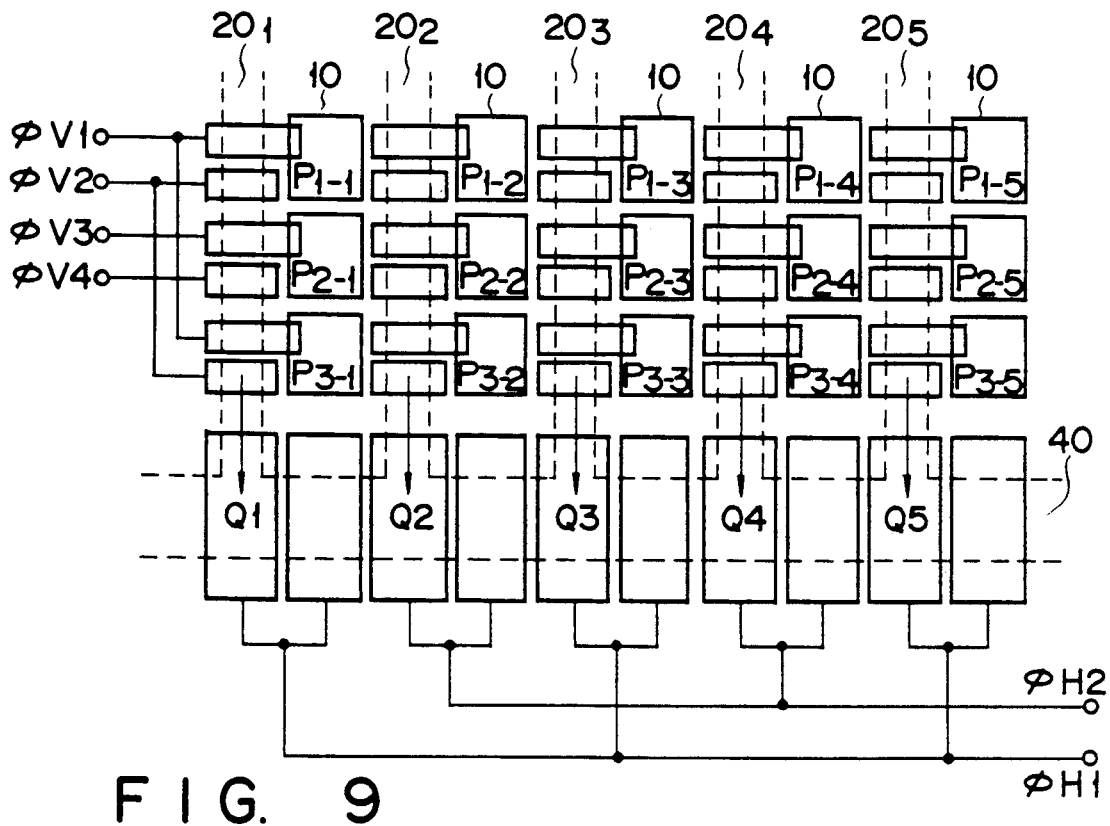
F I G. 9
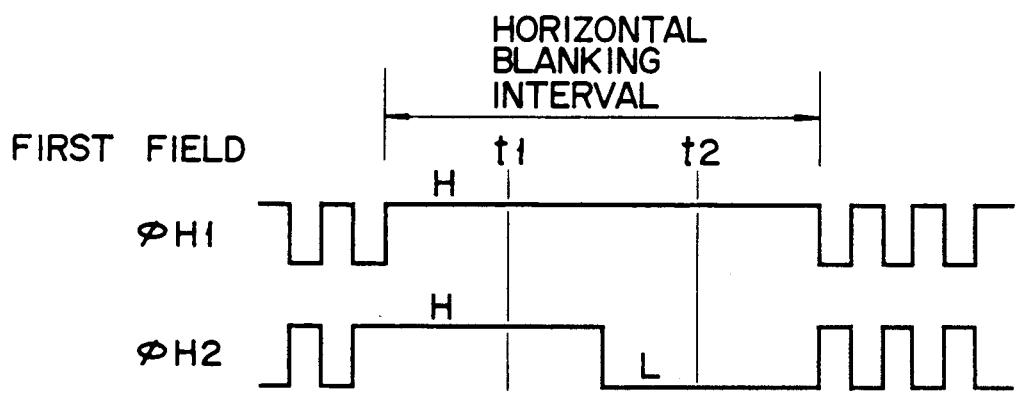
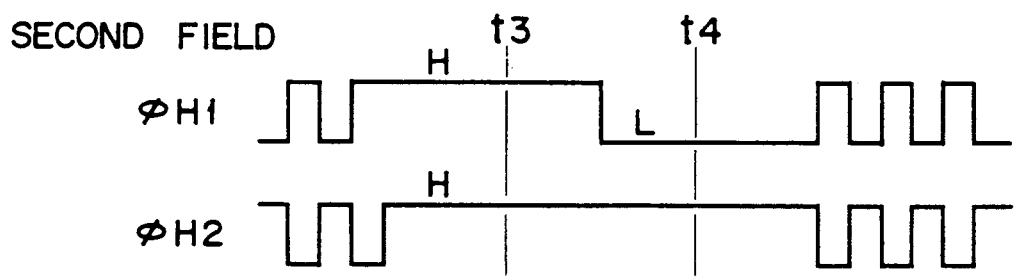
F I G. 10

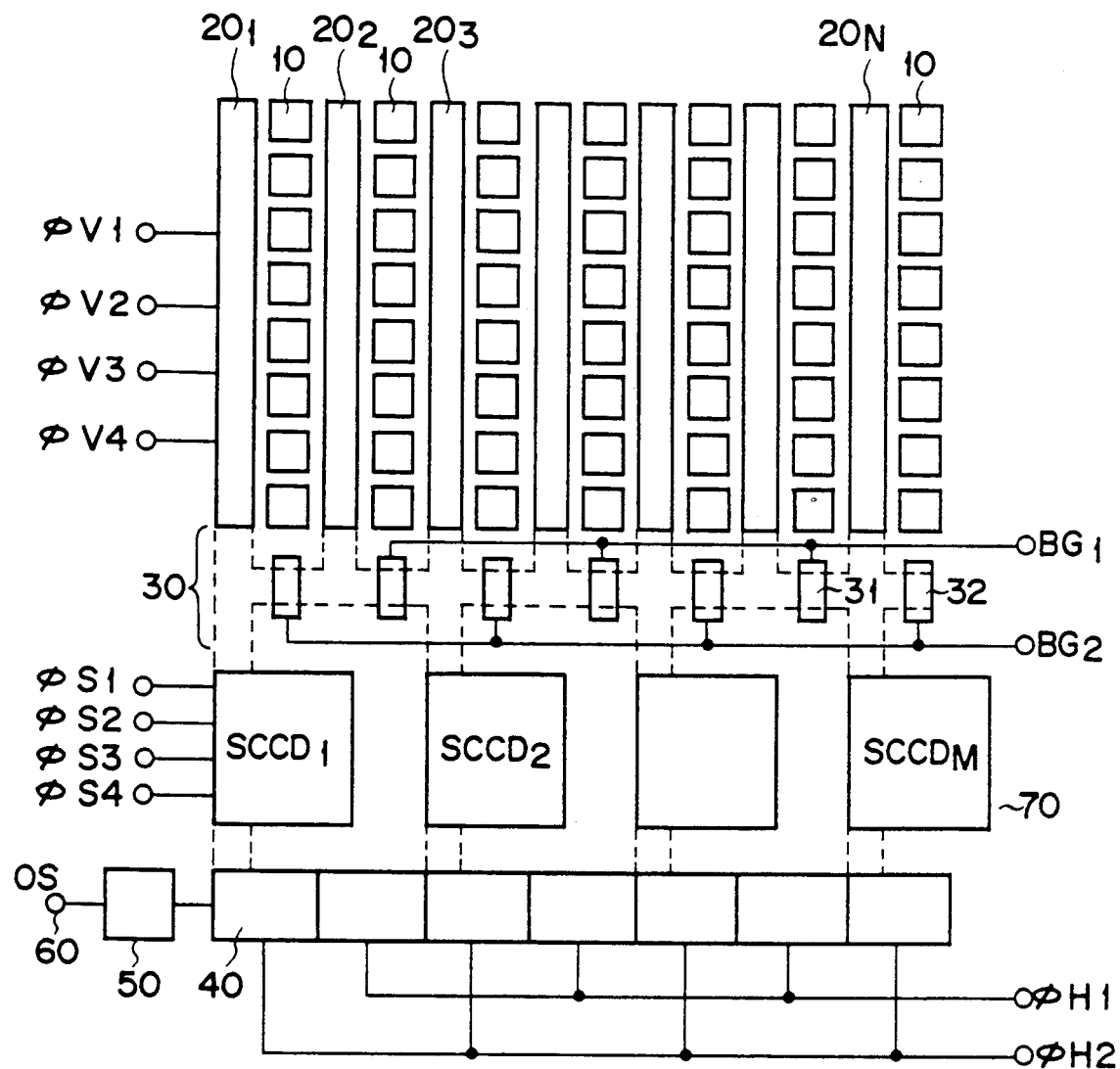
F I G. 12

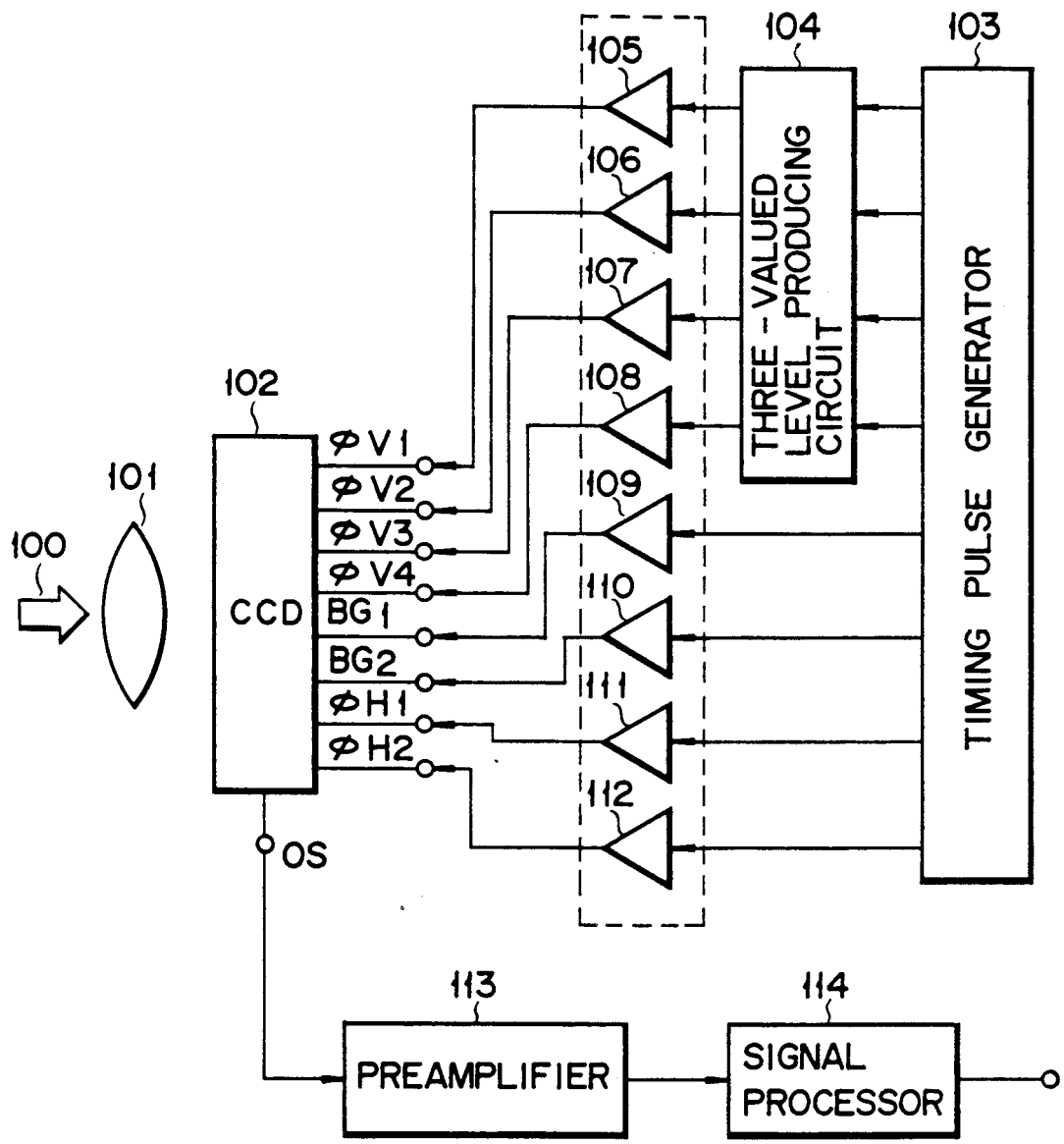
F I G. 15

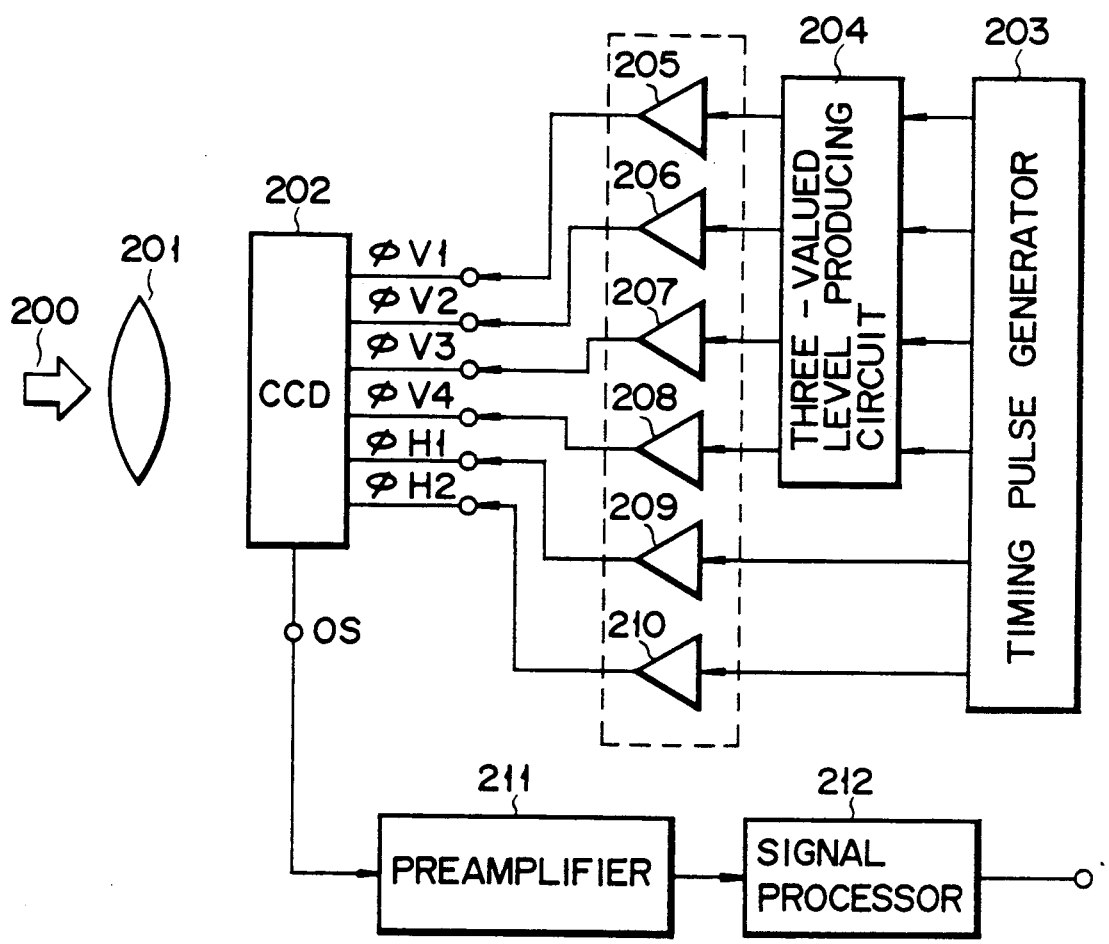
F I G. 16

TWO DIMENSIONAL SOLID STATE IMAGE SENSING DEVICE

BACKGROUND OF THE INVENTION

1. Field of the Invention

The present invention relates to a two-dimensional solid state image sensor, and more particularly to a solid state image sensing device adapted to produce image signals with high resolution and low-level false images using a small number of sampling points within a field.

2. Description of the Related Art

The resolution of a solid state image sensor depends generally on the number of pixels integrated in it. For higher resolution it is required that the number of pixels be increased. However, the increase of the pixels in number results in a higher frequency by which pixel signals are read out. This will broaden the signal bandwidth and increase noise. Furthermore, the increase of the pixels in number will decrease the size of each pixel and hence decrease the amount of charge that each pixel can store. The increase in noise and the decrease in the maximum amount of stored charge will lower the dynamic range of picture signals.

On the other hand, when an object which has a spatial frequency above a Nyquist frequency is picked up by a solid state image sensor, a false signal resulting in a false image such as moire is generated to deteriorate the quality of reproduced images. In order to decrease the false signal, the apertures of pixels have been equivalently made large, for example, by laminating a photoconductor film with the plane of incidence of light or using lenticular lenses. With this approach, however, apertures which are larger than the pitch of the pixels cannot be obtained. According to the method disclosed in Japanese Patent Publication No. 62-40910, a combination of two pixels arranged in the vertical charge transfer direction is changed in even and odd fields and a sum signal of the resultant two pixel signals is output as a video signal, thereby performing interlaced scanning. The method aims mainly at reduction of residual images by performing signal storage not at frame intervals but at field intervals. With the method, vertical false signals can be decreased but there is a problem of generation of horizontal false signals as in the prior device.

A solid state image sensor disclosed in Japanese Patent Early Publication No. 61-133782 can realize a resolution, which is substantially equivalent to that possible with a conventional solid state image sensor having a pixel array of square grid pattern, without increasing the integration of pixels and with lowered pixel-readout frequency. Moreover, the solid state image sensor has a feature that, even if the resolution is increased, the dynamic range can be made great. However, a problem with the device is that the structure is complicated because four signal charge readout gates are required for each pixel and the vertical charge transfer paths have to run in a zigzag.

As described above, if the pixels are increased in number for higher resolution in the prior device, the size of each pixel has to be made small. This results in an increase in noise, the reduction in the maximum amount of signal charge that each pixel can store and the reduction in the dynamic range. Furthermore, where an object having a spatial frequency above a Nyquist frequency is picked up, such false signals which produce moire in reproduced images are generated, thus deteriorating picture quality. On the other hand, where such an arrangement as disclosed in Japanese Patent Early Publication No. 61-133782 is adopted, there arises a problem in the complicated arrangement of the device due to the increased number of signal readout gates and the zigzag signal charge transfer path.

SUMMARY OF THE INVENTION

It is accordingly an object of the present invention to provide a solid state image sensing device which prevents the reduction of the dynamic range and the generation of false signals without complicating the device structure and hence is high in resolution and simple in construction.

According to the present invention, there is provided a solid state image sensing device in which signals of horizontal pixels are added together and a combination of pixels to be added is changed every field.

According to the present invention, a solid state image sensing device, in which a plurality of light receiving elements are arranged in a two-dimensional array and one frame is formed of plural fields, comprises a plurality of signal transfer paths (vertical CCD registers) coupled to the light receiving elements for transferring signal charges sensed by them vertically, a second signal transfer path (horizontal CCD register) for horizontally transferring the signal charges from the first signal transfer paths and an adder section for adding together signal charges from first signal transfer paths adjacent to each other. The adder section performs the addition of signal charges from the n-th and (n−1)-th ones (n is a positive integer) of the first signal transfer paths and the addition of signal charges from the n-th and (n+1)-th ones in alternate fields.

According to the present invention, signal charges of a plurality of pixels (for example, four pixels in 2×2 array) can be added together and the combination of pixels to be added can be changed every field, irrespective of a simple structure in which one signal readout gate is combined with one pixel (a light receiving element and a charge storage section). All the signal charges can be read out within one field. Therefore, a sufficiently large signal charge with little noise can be obtained, the dynamic range can be increased and high-quality reproduced images with reduced residual images can be obtained.

In the present invention, the second signal transfer path can be formed of a horizontal transfer path having stages the number of which is at least half the number of horizontal pixels. The frequency for driving horizontal transfer electrodes may be decreased to at least half. This will decrease the signal bandwidth and hence noise. Thus the dynamic range can be increased and high-resolution images can be obtained. Furthermore, owing to the addition of horizontal and vertical pixels the pixel can have an aperture larger than the pitch of the pixels. Thus, reproduced images with reduced false signals and improved resolution and sensitivity can be obtained by use of a smaller number of pixels. Since the vertical CCD register can be made more simply than in a prior device, a solid state image sensing device having more pixels can be realized.

BRIEF DESCRIPTION OF THE DRAWINGS

FIGS. 4 and 5 are timing diagrams of signals for driving the solid state image sensing device;

FIGS. 6A to 8B are diagrams for illustrating the transfer and addition of signal charges;

FIG. 9 is a diagram illustrating an arrangement of a main portion of a solid state image sensing device according to a second embodiment of the present invention;

FIG. 10 is a timing diagram explanatory of the operation of the solid state image sensing device of FIG. 9;

FIG. 12 is a diagram illustrating an arrangement of a main portion of a solid state image sensing device according to a third embodiment of the present invention;

FIG. 15 is a schematic diagram of a television pickup apparatus using the solid state image sensing device of FIG. 2;

FIG. 16 is a schematic diagram of a television pickup apparatus using the solid state image sensing device of FIG. 9.

DETAILED DESCRIPTION OF THE PREFERRED EMBODIMENTS

Figure 1:
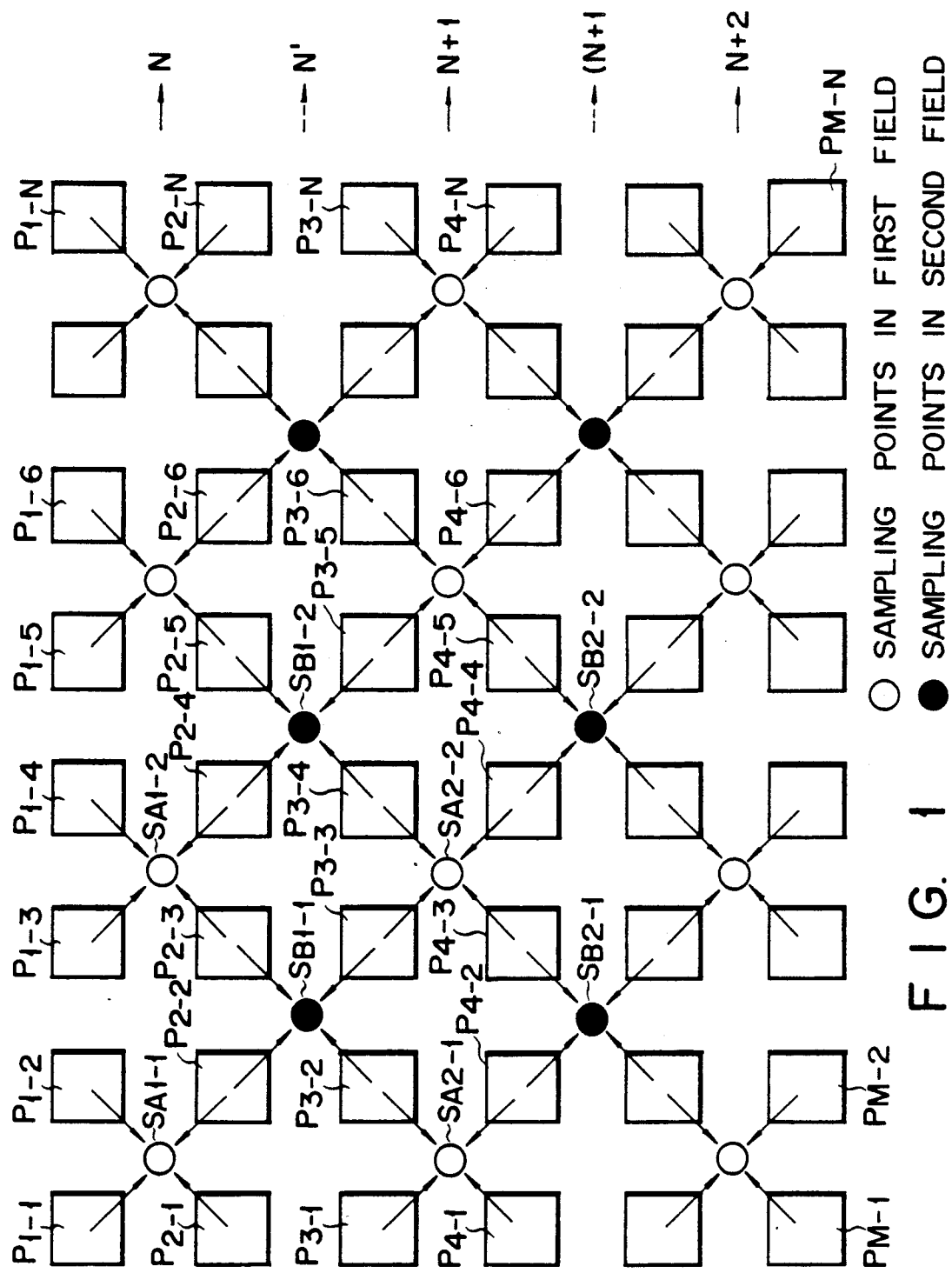
FIG. 1 is a diagram explanatory of an arrangement of pixels and combinations of four pixels for addition in a solid state image sensing device according to a first embodiment of the present invention.

Referring now to FIG. 1, pixels (P1-1, P1-2, ~, P1-N, P2-1, P2-2, ~, P2-N, P3-1, P3-2, ~, P3-N, ~, PM-1, PM-2, ~, PM-N) are arrayed vertically and horizontally (in rows and columns), and signal charges obtained from these pixels are added together for each of sets of four adjacent pixels arranged in two rows and two columns with their sampling points indicated by (SA1-1, SA1-2, ~, SA2-1, ...) for a first field and by -1, SB1-2, ~, SB2-1, ...) for a second field. Scan lines on a reproduced image are indicated by N, N+1, N+2, ... in the first field and by N', N+1', ... in the second field.

The sequence of recombination of pixels for addition of signal charges will now be described. A description is made here of a case where four pixels are added together. In the television system in which one frame is formed of the first and second fields, pixel sampling points corresponding to the N-th scan line in the first field are SA1-1, SA1-2, .... For sampling point SA1-1 the signal charges of pixels P1-1, P1-2, P2-1 and P2-2 are sensed for addition. To detect the next sampling point SA1-2 the signal charges of pixels P1-3, P1-4, P2-3 and P2-4 are added together. The pixel sampling points SA2-1, SA2-2 corresponding to the (N+1)-th scan line are likewise respectively detected by adding signal charges from pixels P3-1, P3-2, P4-1 and P4-2 together and by adding signal charges from pixels P3-3, P3-4, P4-3 and P4-4 together. This operation is performed for each of the scan lines. The pixel sampling points SB1-1, SB1-2 corresponding to the N'th scan line in the second field are respectively detected by adding signal charges from pixels P2-2, P2-3, P3-2 and P3-3 together and by adding signal charges from pixels P2-4, P2-5, P3-4 and P3-5 together. It is to be noted here that, in the first and second fields, the four pixels are added together with one pixel shifted both horizontally and vertically. As a result, the sampling points in the respective fields will be located as indicated by symbols  and •.

The above operation is performed for each of the scan lines so that effects result in which apertures formed of pixels and larger than the pitch of pixels are obtained and the apertures overlap between the first and second fields. This will decrease the false signals which produce moire in reproduced images. Since the sampling points in the first and second fields are shifted by 180 degrees in phase, a resolution of displayed images will be as high as that depends substantially upon the number of horizontal pixels. Since signal charges are read out of all the pixels within one field, reproduced images having small residual images can be obtained. Furthermore, since four pixels are added together for readout, a signal charge results which is double the charge obtained by adding two vertical pixels. Hence the influence of noises entering an output section of the device becomes small and the signal to noise ratio is improved. In the present invention, the number of horizontal transfer electrodes may be half that of prior devices. Moreover, the horizontal transfer frequency may also be halved. Although the horizontal pitch of pixels depends conventionally on the configuration of horizontal transfer electrodes, it does not have to depend on the horizontal transfer electrodes in the present invention. Therefore, the manufacture of the solid state image sensing device becomes easy and a solid state pickup device of a higher resolution becomes feasible.

Figure 2:
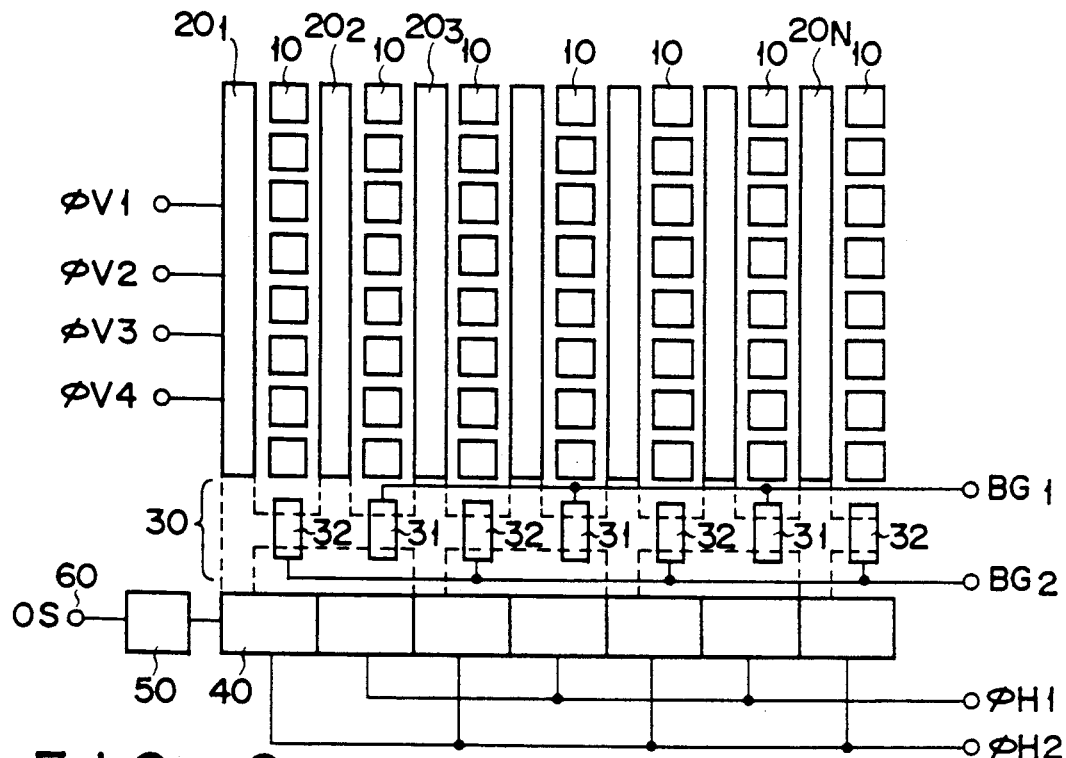
FIG. 2 is a schematic diagram of the solid state image sensing device.
Figure 3:
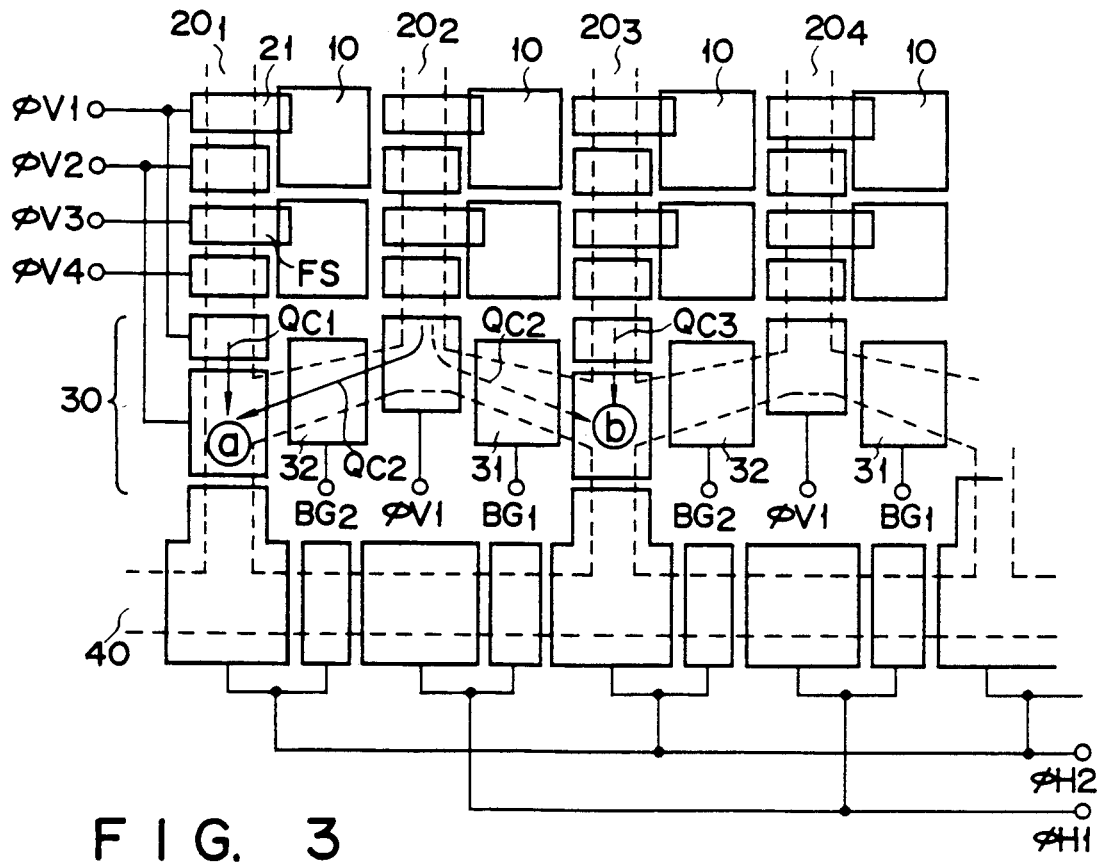
FIG. 3 illustrates an arrangement of a main portion of the solid state image sensing device of FIG. 2.

Next, an embodiment of the solid state image sensing device for carrying out the operation illustrated in FIG. 1 will be described. FIG. 2 is a schematic diagram of a solid state image sensing device according to an embodiment of the present invention, and FIG. 3 illustrates an arrangement of electrodes adapted to add signal charges together.

Referring to FIG. 2, the solid state image sensing device comprises pixels (P1-1, P1-2, ~, PM-N) 10, vertical CCD registers (first signal transfer paths) 20 (201-20N), adder electrodes 30, a horizontal CCD register (second signal path) 40, an output amplifier 50 and an output terminal 60. Each of vertical CCD registers 20 is a register driven by four-phase clock signals ($\phi V1$, $\phi V2$, $\phi V3$, $\phi V4$), while horizontal CCD register 40 is driven by two-phase clocks ($\phi H2$, $\phi H2$). In adder electrodes 30 use is made of first and second adder electrodes 31 and 32 and partial electrodes of vertical CCD registers 20 (in the present case, electrodes supplied with clocks $\phi V1$, $\phi V2$). In FIG. 3, dotted lines represent signal charge transfer paths.

Signal charges are read from pixels 10 through field shift gates 21 combined with those transfer electrodes of vertical CCD registers 20 which are supplied with clocks $\phi V1$, $\phi V3$. The addition of signals from pixels arranged vertically is performed by timing vertical CCD register 20. The addition of pixels arranged horizontally, which is characteristic of the present invention, is performed by means of adder electrodes 30. For example, in order to add signal charges from vertical CCD registers 201 and 202, adder gate 31 is closed and adder gate 32 is opened. As a result, signal charge QC1 from register 201 and signal charge QC2 from register 202 are added together at point  as shown. To add signal charges from vertical CCD registers 202 and 203, adder gate 32 is closed, while adder gate 31 is opened. The addition of signal charge QC2 from register 202 and signal charge QC3 from register 203 is performed at point      as shown.

Figure 5:
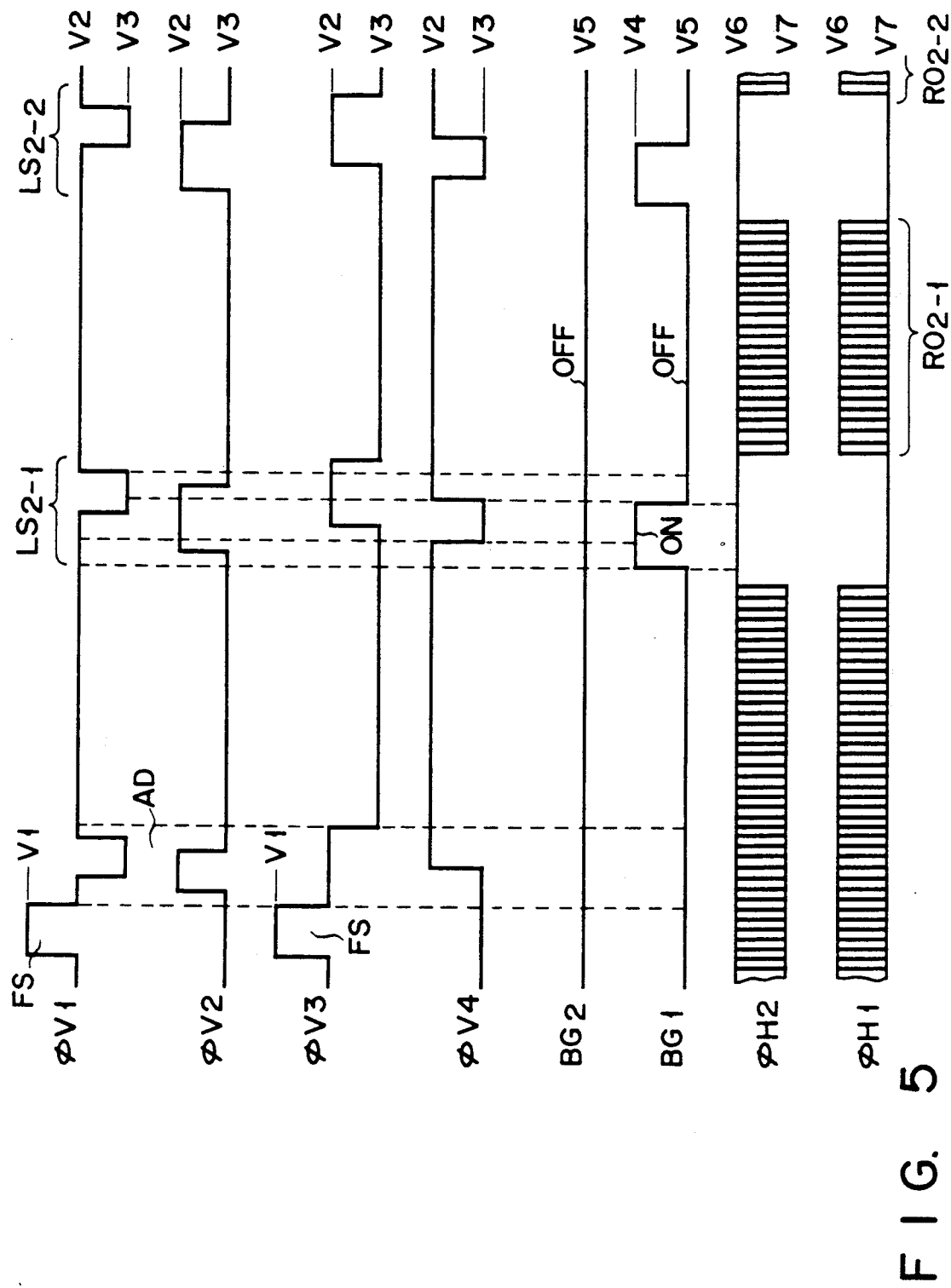

The above operations will be described more specifically with reference to FIGS. 4 to 8B. FIG. 4 is a timing diagram of the operations in the first field, while FIG. 5 is a timing diagram of the operations in the second field. FIGS. 6A and 6B illustrate the addition of vertical pixels, while FIGS. 7A, 7B, 8A and 8B illustrate the addition of horizontal pixels. In FIGS. 4 and 5, V1 to V7 represent predetermined voltages applied to electrodes. FS represents a field shift interval during which signal charge is read out of a pixel. AD represents an interval during which vertical pixels are added. LS1-1, LS1-2, LS2-1 and LS2-2 represent line shift intervals during which signal charges are transferred vertically. RO1-1, RO1-2, RO2-1 and RO2-2 represent readout operations of horizontal CCD register 40.

Figure 7A:
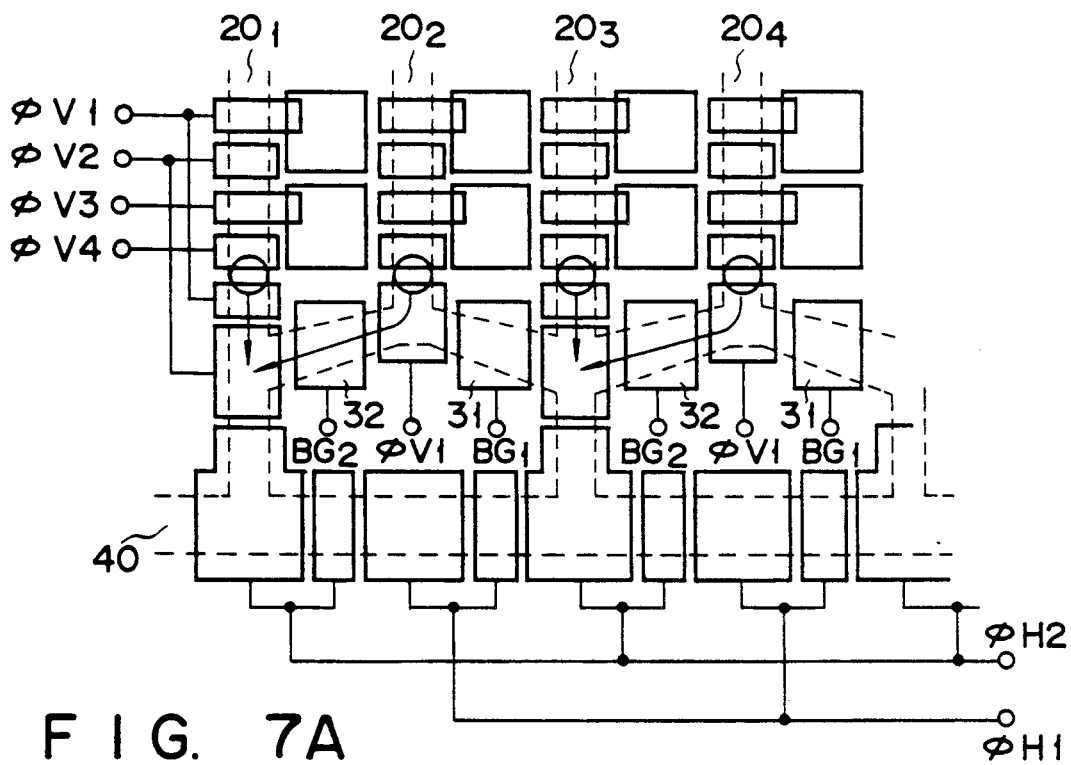
Figure 7B:
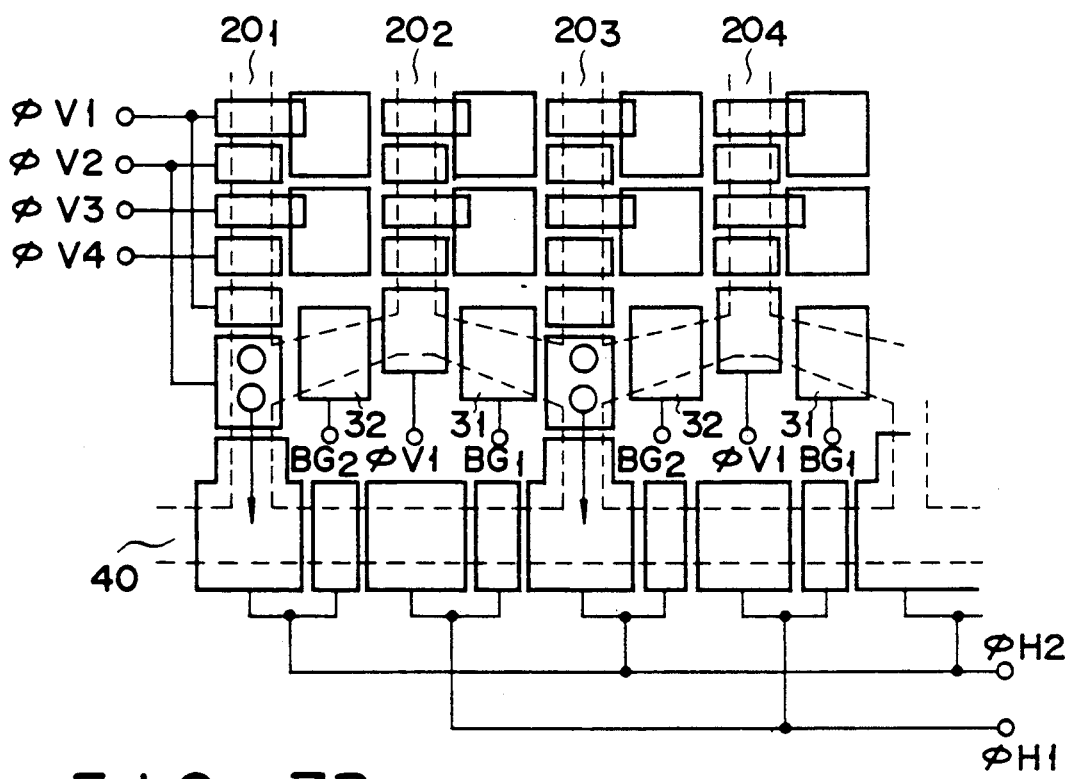

FIG. 6A illustrates an operating state of the device in the first field in which the timing pulses of FIG. 4 are applied to corresponding electrodes. Symbols      represent locations of signal charges. Field shift voltage V1 is first applied to $\phi$V1, $\phi$V3 electrodes so that signal charges are read out of two vertical pixels corresponding to those electrodes. The charges from the two vertical pixels are added together during the interval AD. The resultant charges o are transferred up to locations shown in FIG. 7A through the line shift operation. In FIG. 7A, adder gate 31 is closed and adder gate 32 is opened with the result that the signal charge transferred through vertical CCD register 201 and the signal charge transferred through vertical CCD register 202 are added together. After signal charges from two horizontal pixels are added together, the resultant charge is transferred to horizontal CCD register 40 and then read out to the outside.

Figure 8A:
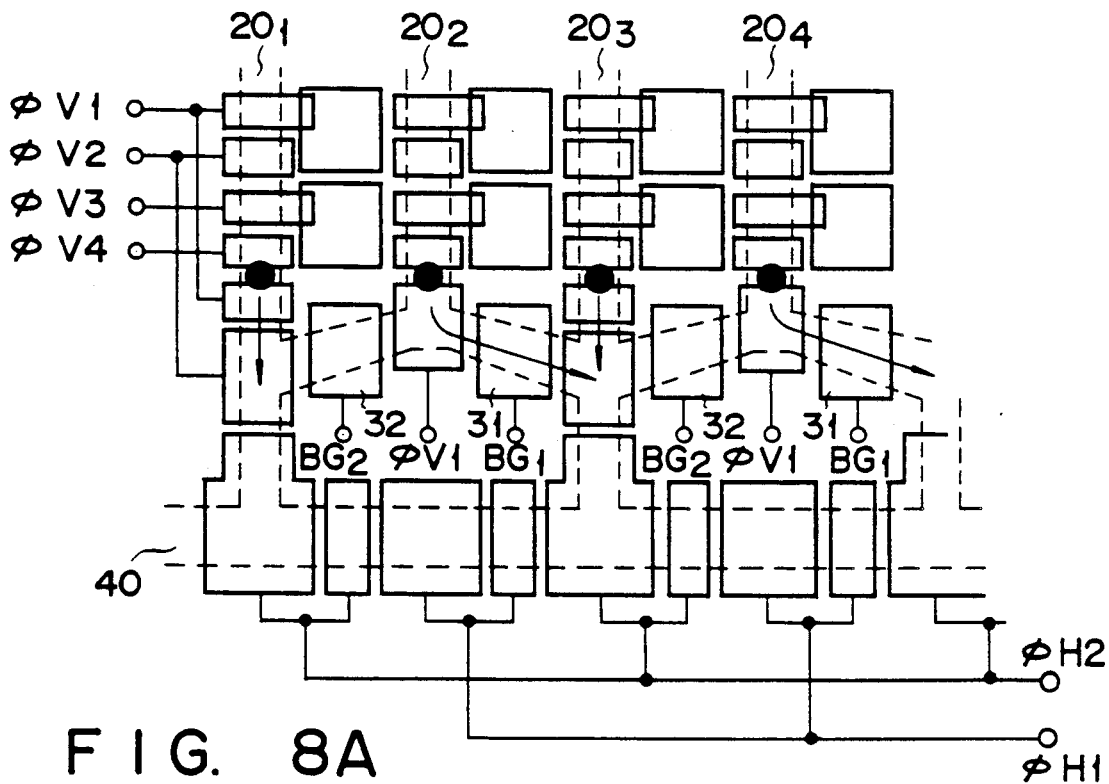
Figure 8B:
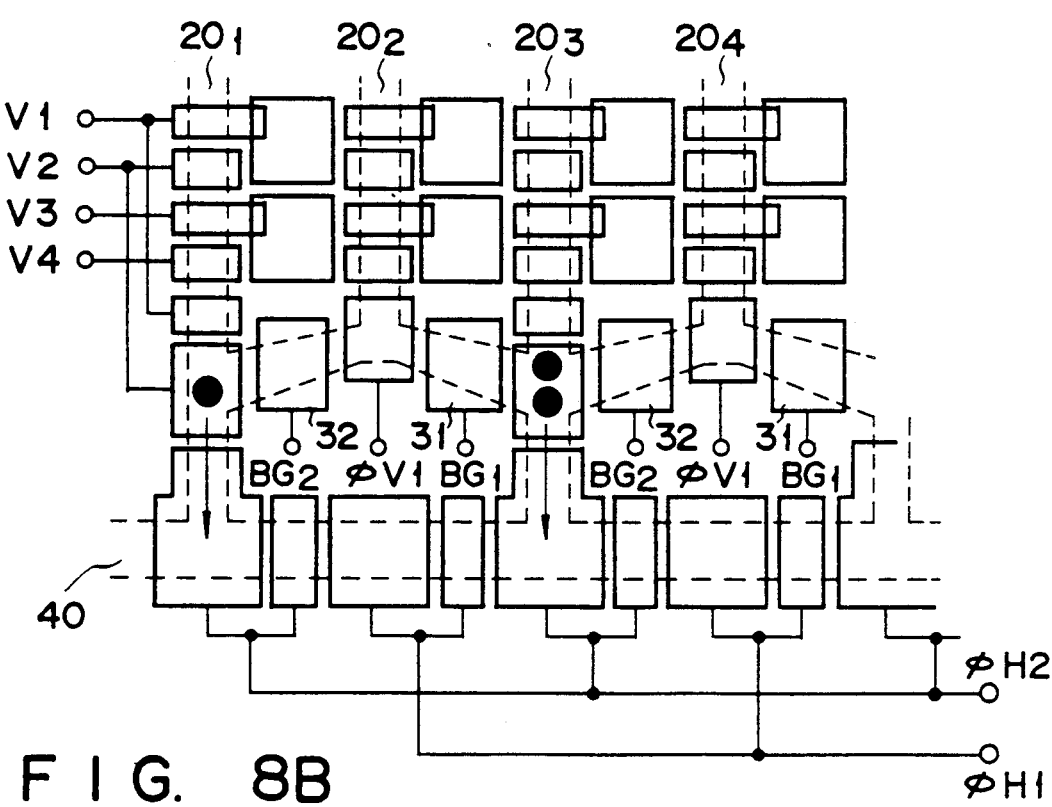

In the second field, the timing pulses shown in FIG. 5 are applied to corresponding electrodes and signal charges are represented by      in FIG. 6B. In this case the combination of two pixels to be added is vertically shifted by one pixel from that in the first field. As shown in FIG. 8A, adder gate 32 is closed, while adder gate 31 is opened. As a result, signal charges transferred through vertical CCD registers 202 and 203 are added together. This addition is performed with one pixel shifted horizontally from the first field.

When the above operations are performed for all the pixels, four pixels are added as illustrated in FIG. 1 and signals obtained at sampling points can be reproduced.

According to the present embodiment, as described above, simply combining one field shift gate with one pixel enables signal charges of four pixels arrayed vertically and horizontally to be added and moreover the combination of four pixels for addition to be changed every field. Therefore, sufficiently large signal charges with little noise can be obtained, resulting in increased dynamic range, improved resolution and reduced moire. Furthermore, vertical CCD registers 20 may be made linear and the addition of pixels may be implemented by use of signal transfer paths formed in a simple shape. This will provide a solid state image sensing device with more pixels. In contrast to the prior device, the number of horizontal transfer stages may be halved for the same resolution. The horizontal transfer frequency may also be halved. Thus, the signal bandwidth can be lowered and noise is reduced correspondingly, resulting in great dynamic range. Furthermore, there is an advantage in that high-quality pictures which are reduced in residual images can be obtained because all the pixels store signal charges and they are read out every field.

Next, a second embodiment of the present invention will be described. In this embodiment, the function of the adder electrodes in the first embodiment is implemented by a method of driving the horizontal CCD register. FIG. 9 illustrates the main part of the second embodiment. FIG. 10 is a timing diagram of transfer pulses $\phi$H1 and $\phi$H2 applied to transfer electrodes of horizontal CCD register 40. FIGS. 11A to 11E illustrate the transfer of charge through the horizontal CCD register. This second embodiment is arranged such that a signal charge is transferred from vertical CCD registers 20 to the transfer electrodes of horizontal CCD register 40 which are supplied with pulses $\phi$H1 and $\phi$H2. That area in the register which is indicated in dotted lines represents a signal transfer path. $\phi$V1, $\phi$V2, $\phi$V3 and $\phi$V4 represent pulses applied to the transfer electrodes of vertical CCD register 20, while $\phi$H1, $\phi$H2 pulses are applied to the transfer electrodes of horizontal CCD register 40. Q1 to Q5 represent signal charges transferred from vertical CCD registers 20, each of them resulting from the addition of signal charges from two vertical pixels.

Figure 11A:
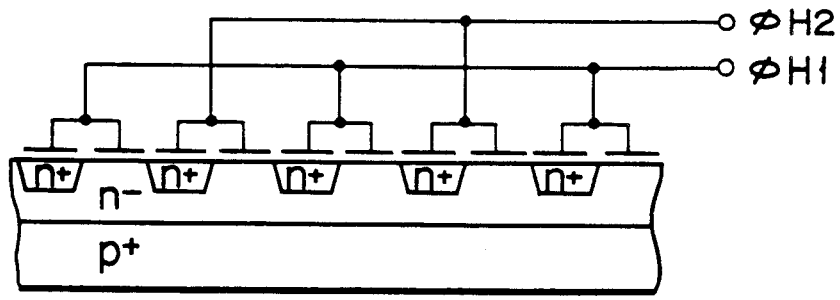
FIGS 11 to 11E are diagrams explanatory of addition of signal charges.
Figure 11B:
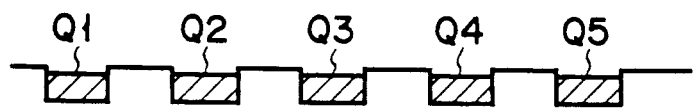
Figure 11C:
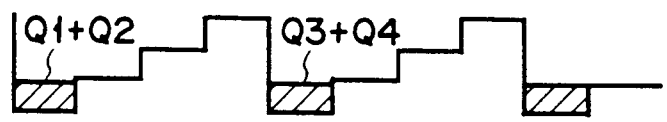
Figure 11D:
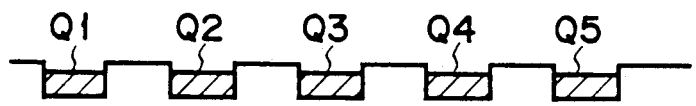
Figure 11E:
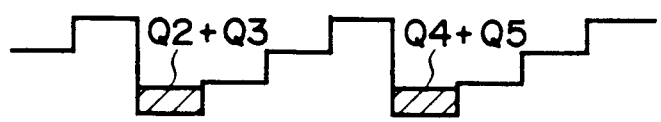

Pixels Q1 to Q5 transferred from vertical CCD registers 201 to 205 to horizontal CCD register 40 are added during a horizontal blanking interval as shown in the timing diagram of FIG. 10. At time t1 in the first field, signal charges of vertical pixels are transferred horizontally and independently. At this point $\phi$H1 and $\phi$H2 are both at H level, and the state of charge in register 40 is illustrated in FIG. 11B. At t2 $\phi$H2 goes to L level, while $\phi$H1 remains at H level. As a result, two signal charges are added together as Q1+Q2, Q3+Q4, ... as shown in FIG. 11C. In the next second field, pulses $\phi$H1 and $\phi$H2 first go to H level as is the case with the first field with the result that signal charges from vertical CCD registers 20 are transferred horizontally. The state of signal charges at this point is the same as that of FIG. 11B as shown in FIG. 11D. Pulse $\phi$H2 goes to L level, while pulse $\phi$H2 remains at H level as opposed to the first field. As a result, two signal charges are added as Q2+Q3, Q4+Q5, ... as shown in FIG. 11E with one pixel shifted horizontally from the case of the first field.

As a result of the above operations, pixels each resulting from addition of two vertical pixels are added horizontally in units of two pixels. That is, pixels of a two-by-two array are added together to form one pixel with the result that the sampling points described in connection with FIG. 1 are obtained.

According to the present embodiment, therefore, there is no need for the particular provision of the adder electrodes adapted to add signal charges horizontally, thus simplifying the construction of the device. It goes without saying that the present embodiment can achieve the same advantages as the previous embodiment.

A third embodiment of the present invention will now be described hereinafter. In FIG. 12, charge storage sections 70 adapted to store signal charges using interline transfer structure CCDs are formed in the optically sensitive imaging area and a frame inter-line transfer type CCD with a horizontal CCD register has the device structure according to the present invention. The structure is characterized in that adder electrodes 30 are provided between vertical CCD registers 20 and charge storage sections 70. Owing to this structure the number of transfer stages in charge storage section 70 and horizontal CCD register 40 can be halved. With the present embodiment, the addition of signal charges is performed in the same manner as the embodiment of FIG. 2. That is, signal charges are added together in units of two pixels in each of vertical CCD registers 20 and the resultant charges from register 20 are added together horizontally in units of two pixels by switching gates. Four pixels of a 2 (vertical)×2 (horizontal) array are added and the resultant charge is transferred to storage section 70.

Figure 13:
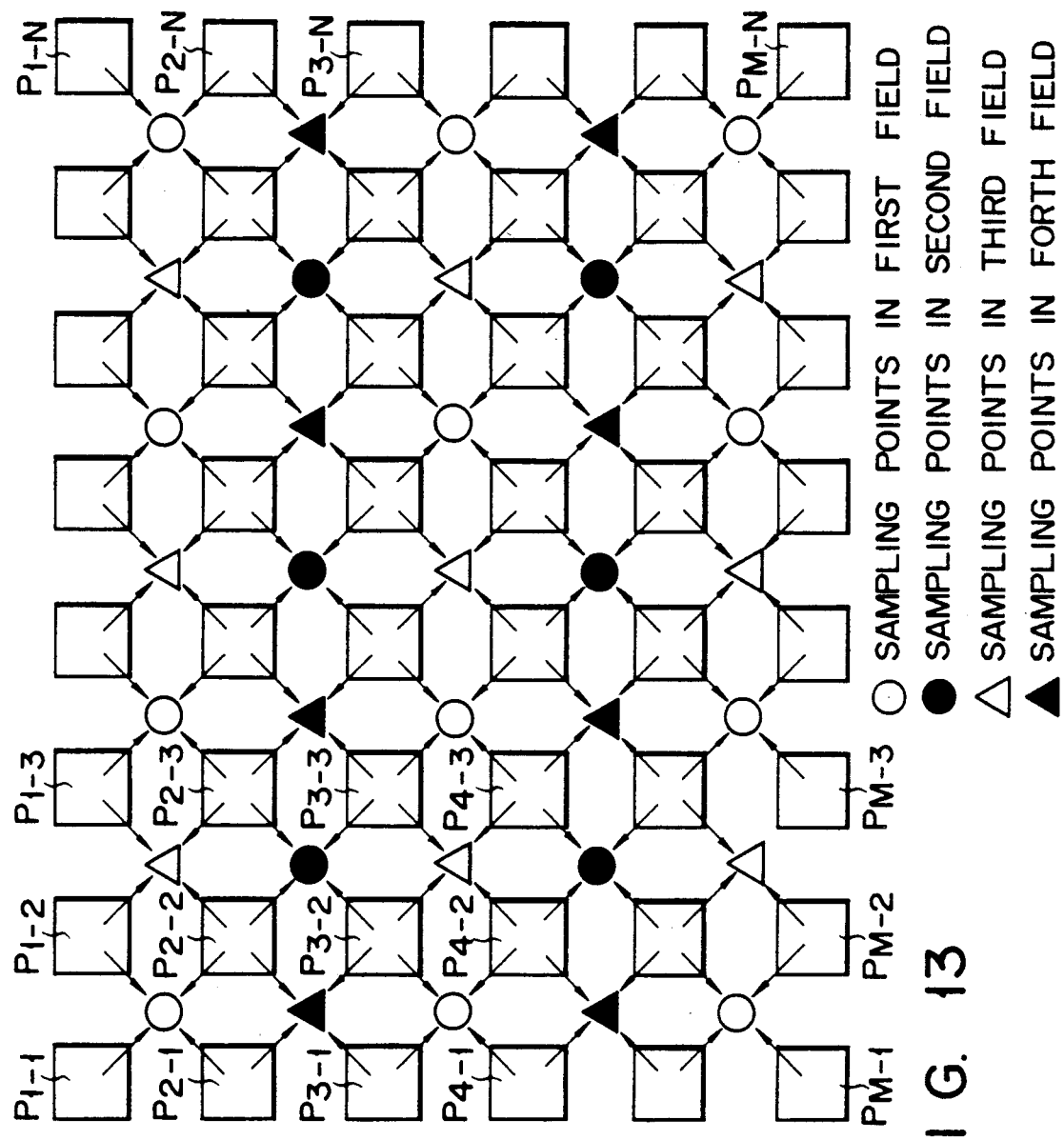
FIGS. 13 and 14 are diagrams explanatory of an arrangement of pixels and combinations of four pixels for addition in the solid state image sensing device according to the third embodiment of the present invention.
Figure 14:
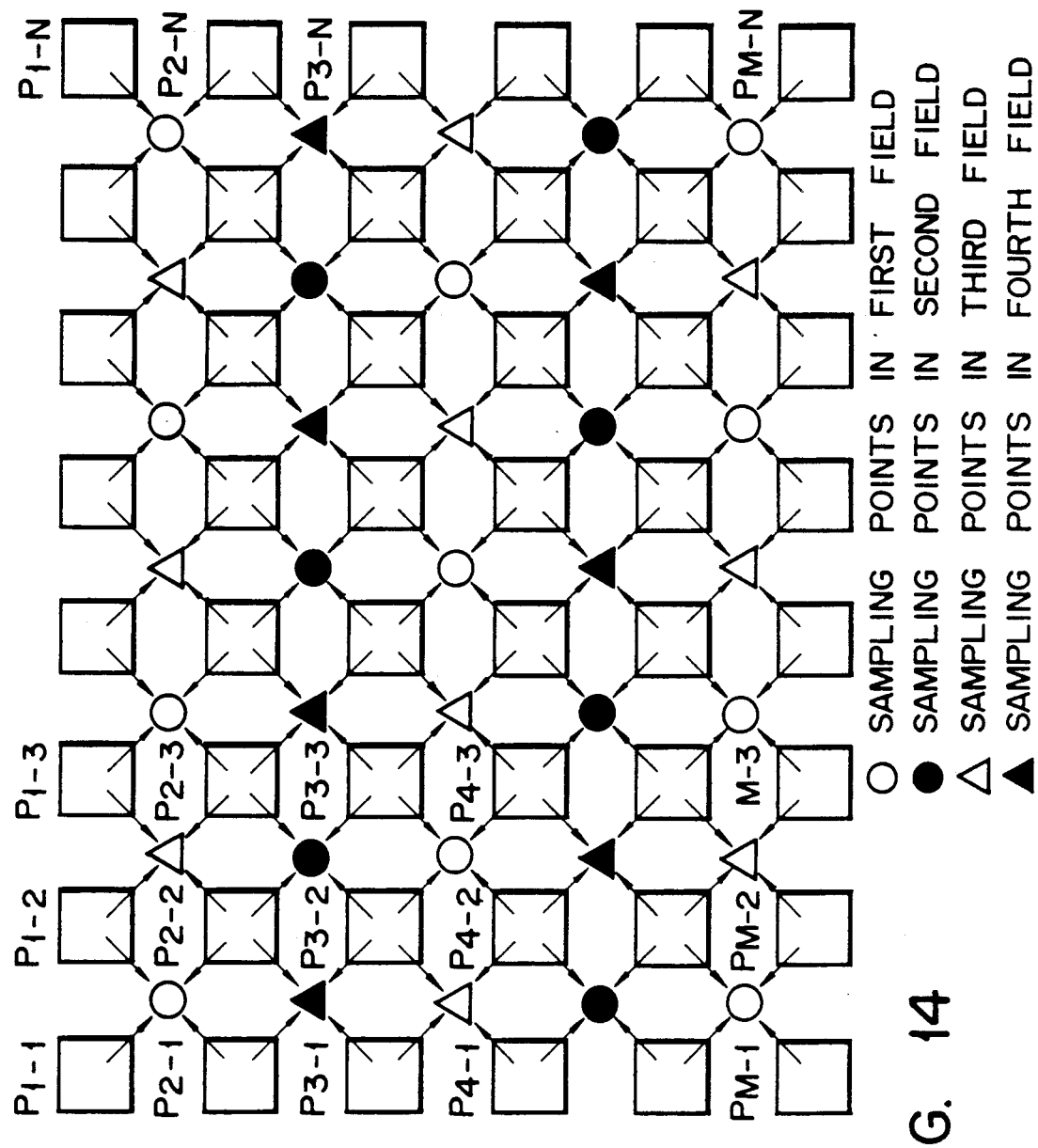

The present invention need not be limited to the above embodiments. For example, the combination of pixels to be added is not limited to that described in connection with FIG. 1. Although, in FIG. 1, there is illustrated an example in which two first and second fields form one frame of picture, the present invention may be applied to a case where four first, second, third and fourth fields form one frame as shown in FIGS. 13 and 14. If one frame is formed of four fields, the moire will be decreased further and the number of effective sampling points will increase. This will offer a further improvement in resolution. In FIGS. 13 and 14, arrows indicate combinations of pixels to be added. Symbol represents sampling points in the first field, sampling points in the second field, Δ sampling points in the third field and sampling points in the fourth field. Such sampling points can be obtained in the same manner as that described in connection with FIGS. 2 to 12.

Although an interline charge transfer CCD has been used in the embodiments, the present invention may also be applied to a frame-storage charge transfer CCD, an MOS solid state image sensing device, a line address solid state image sensing device or the like. To apply the present invention it is necessary only that signal charges be read out of all the pixels within one field. In the case of the MOS solid state image sensing device, the first and second signal paths are used as signal lines and MOS gates are placed between the signal lines and light-receiving elements. By controlling the timing of on and off of the MOS gates, it is possible to perform the same adding process as in the above embodiments. The present invention may also be applied to a solid state image sensing device of a two-layer structure using a photoelectric conversion film made of, for example, amorphous silicon as the light receiving surface. In this case, the aperture of the device itself can be made large. Thus, the moire will be decreased further and the sensitivity will be improved, resulting in a significant improvement in picture quality. The present invention may be modified in various ways without departing from the scope of the invention.

According to the present invention, as described above, since the adder electrodes are arranged between the first signal paths and the second signal path, the addition of signal charges of horizontal pixels can be made and the combination of the pixels to be added can be changed every field, irrespective of a simple construction in which one signal readout gate is used with one pixel. Therefore, the reduction in dynamic range with an increase in the number of pixels and the generation of false signals which produce the moire can be prevented without giving rise to complication in device structure. It thus becomes possible to realize a solid state image sensing device of high resolution and simple construction.

Next, pickup devices equipped with the above solid state image sensing devices will be described.

FIG. 15 shows a schematic arrangement of a pickup device using the solid state imaging device of FIG. 2 and operating in the manner illustrated in FIGS. 4 to 8B.

An input optical image 100 is imaged onto a solid state image sensing device 102 by an objective lens 101. To solid state image sensing device 102 are applied clock pulses $\phi V1$, $\phi V2$, $\phi V3$, $\phi V4$, BG1, BG2, $\phi H1$ and $\phi H2$ which are shown in FIGS. 4 and 5. These clock pulses are output from drivers 105 to 112 of a clock driver circuit. Clock drivers 105 to 108 are output from a three-valued level producing circuit 104, which is responsive to timing pulses output from a timing pulse generating circuit 103 to produce three-valued pulses necessary for driving the vertical CCD registers in solid state image sensing device 102. The three-valued pulses may readily be formed by using an analog multiplexer. Clock drivers 109 to 112 are responsive to timing pulses from timing pulse generating circuit 103 to apply pulses BG2, BG2, $\phi H1$ and $\phi H2$.

Output terminal OS of solid state image sensing device 102 is connected to an input terminal of a preamplifier 113, and an image signal output from the solid state image sensing device is amplified by preamplifier 113 and then applied to a signal processor 114. Signal processor 114 performs impedance conversion, gamma correction, white clipping, etc. on the image signal to provide a TV signal.

FIG. 16 shows a schematic arrangement of a pickup device using the solid state imaging device of FIG. 9 and operating in the manner illustrated in FIG. 10 and FIGS. 11A to 11E.

An input optical image 200 is imaged onto a solid state image sensing device 202 by an objective lens 201. To solid state image sensing device 202 are applied clock pulses $\phi H1$ and $\phi H2$ shown in FIG. 10 and vertical CCD register driving pulses $\phi V1$, $\phi V2$, $\phi V3$ and $\phi V4$ which are shown in FIGS. 4 and 5. These clock pulses are output from drivers 205 to 210 of a clock driver circuit. Clock drivers 205 to 208 are supplied with three-valued pulses from three-valued level pulse producing circuit 204. The three-valued pulses are produced from timing pulses output from a timing pulse generating circuit 203 and are used for driving the vertical CCD registers in solid state image sensing device 102.

The arrangement of FIG. 16 eliminates the need for clock pulses BG1 and BG2 in the arrangement of FIG. 15 and thus becomes more simple in construction.

Output terminal OS of solid state image sensing device 202 is connected to an input terminal of a preamplifier 211, and an image signal output from the solid state image sensing device is amplified by preamplifier 211 and then applied to a signal processor 212. Signal processor 212 performs impedance conversion, gamma correction, white clipping, etc. on the image signal to provide a TV signal.

Figure 17:
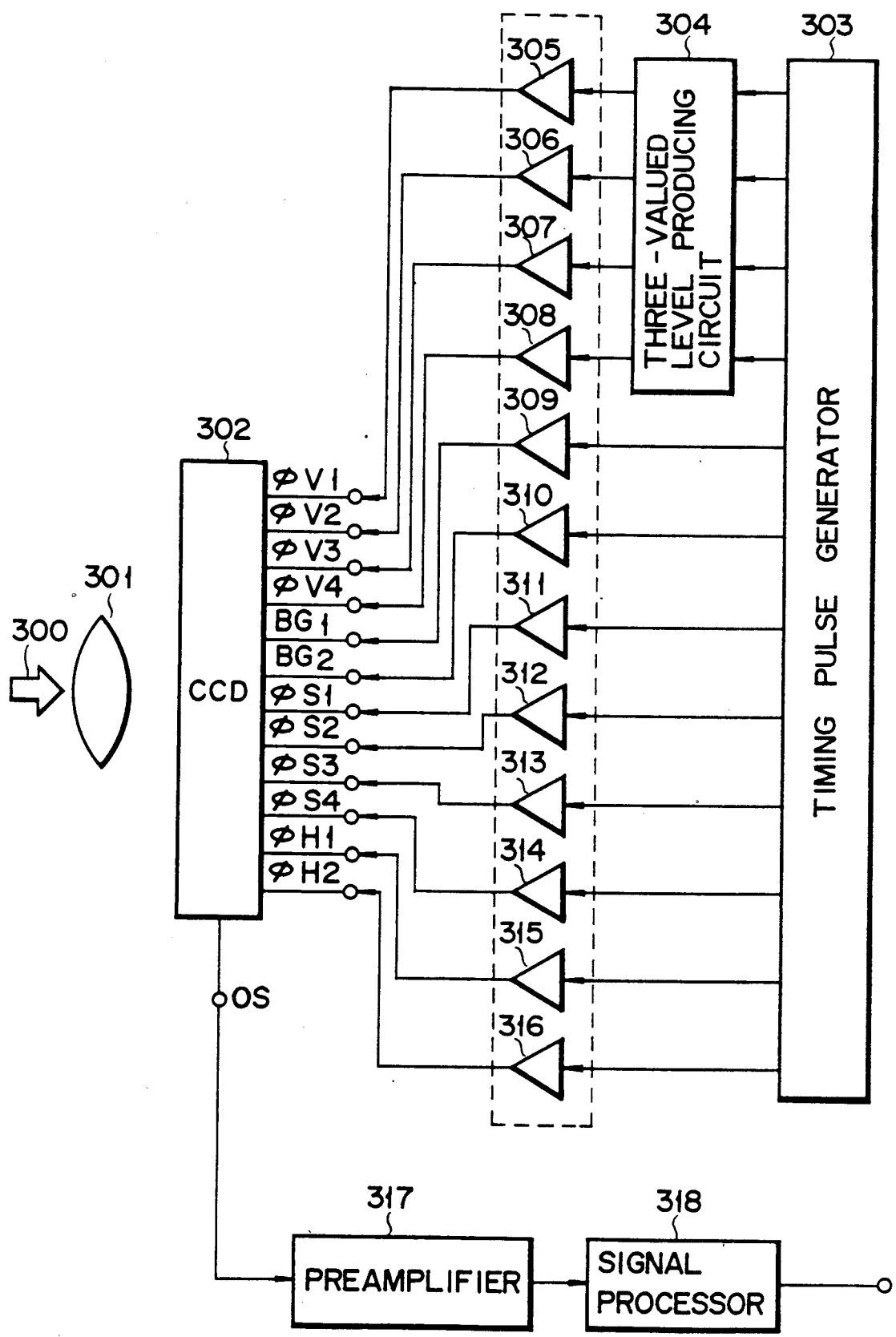
FIG. 17 is a schematic diagram of a television pickup apparatus using the solid state image sensing device of FIG. 12.

FIG. 17 illustrates a circuit arrangement of a pickup device equipped with a solid state image sensing device using the frame interline charge transfer CCD shown in FIG. 12.

In the arrangement, twelve clock pulses $\phi V1$, $\phi V2$, $\phi V3$, $\phi V4$, BG1, BG2, $\phi S1$, $\phi S2$, $\phi S3$, $\phi S4$, H1, $\phi H2$ are applied from clock drivers 305 to 316 to solid state image sensing device 302. Three-valued level producing circuit 304 forms three-valued pulses necessary for driving the vertical CCD registers in solid state image sensing device 302. Timing signal generating circuit 303 produces required timing pulses.

An image signal output from solid state image sensing device 302 is amplified by preamplifier 317 and then applied to signal processor 318. Signal processor 318 performs processes such as impedance conversion, gamma correction and white clipping on the image signal to provide a TV signal.

What is claimed is:

1. A solid state image sensing device comprising:
   a great number of light receiving elements arrayed in matrix form and including vertically arrayed light received element;
   a plurality of first charge transfer means coupled to said vertically arrayed light receiving elements for vertically transferring signal charges sensed thereby
   second charge transfer means for horizontally transferring signal charges transferred from said plurality of first charge transfer means;
   adder means for adding together signal charges sensed by a predetermined number of light receiving elements adjoining vertically and horizontally to provide one added signal charge, and providing a plurality of added signal charges for all of said receiving elements in each field; and
   field switching means for introducing into said adder means signal charges obtained from said light receiving elements shifted by at least one light receiving element in alternate fields.

2. A solid state image sensing device according to claim 1, wherein said adder means comprises first adder means for reading signal charges out of at least two of said light receiving elements adjoining vertically, adding the signal charges together to obtain a vertically added signal charge, and transferring the vertically added signal charge to said first charge transfer means, and second adder means for adding vertically added charges transferred from at least two of said first charge transfer means which adjoin horizontally.

3. A solid state image sensing device according to claim 2, wherein said first adder means comprises field shift gates coupled to said light receiving elements and said first charge transfer means which are opened at a time of readout of charge, and said second adder means comprises gates coupled to outputs of said first charge transfer means for, when opened, connecting outputs of adjacent first charge transfer means.

4. A solid state image sensing device according to claim 2, wherein said first adder means comprises field shift gates coupled to said light receiving elements and said first charge transfer means which are opened at a time of readout of charge, and said second adder means comprises means for driving said second charge transfer means receiving vertically added signal charges transferred from said first charge transfer means such that adjacent vertically added signal charges are added.

5. A solid state image sensing device according to claim 4, wherein said first charge transfer means comprises a plurality of four-phase driven vertical CCD registers each of which is adjacent to a vertical array of said light receiving elements, said second charge transfer means comprises a two-phase driven horizontal CCD register placed on the side of outputs of said vertical CCD registers, and said second adder means comprise adder gates each of which is provided between a portion of said vertical CCD register and adjacent vertical CCD register.

6. A solid state image sensing device according to claim 1, wherein said field switching means comprises means for switching signal charge paths every field.

7. A solid state image sensing device according to claim 1, wherein said adder means comprises first adder means for reading signal charges out of at least two light receiving elements adjoining vertically, adding the signal charges together, to obtain a vertically added signal charge, and transferring the vertically added signal charge to said first charge transfer means, and second adder means for adding charges transferred from said first charge transfer means and stored in said second charge transfer means in units of two adjacent charges.

8. A solid state image sensing device according to claim 7, wherein said second adder means comprises means for repeatedly varying potentials applied to adjacent elements of said second charge transfer means.

9. A solid state image sensing device comprising
   a plurality of light receiving elements arrayed two-dimensionally;
   a plurality of first signal transfer paths coupled to said light receiving elements for taking signal charges sensed by said light receiving elements therefrom and transferring them vertically;
   a second signal transfer means for receiving signal charges transferred from said first signal transfer path and transferring them horizontally for readout; and
   adder means for adding signal charges transferred from adjacent ones of said first signal transfer paths;
   said adder means performing the addition of signal charges from the n-th and (n−1)-th (n is a positive integer) ones of said first signal paths and the addition of signal charges from the n-th and (n+1)-th ones of said first signal paths in alternate fields.

10. A solid state image sensing device according to claim 9, wherein said first and second signal paths are formed of CCD registers or signal lines.

11. A solid state image sensing device according to claim 9, wherein said adder means changes the combination of said first signal paths for addition every field.

12. A solid state image sensing device according to claim 9, wherein said adder means comprises adder gates connected between said first and second signal paths so as to add two signal charges when signal charges are transferred from said first signal transfer paths to said second signal transfer path.

13. A solid state image sensing device according to claim 9, wherein said adder means adds two signal charges in said second signal transfer means during an interval or immediately after signal charges are transferred from said first signal paths to said second signal path.

14. A method of driving a solid state image sensing device having a plurality of light receiving elements arrayed in a matrix form, said method comprising the steps of:
    taking signal charges out of the light receiving elements arrayed in two columns and two rows, vertically and horizontally;
    adding together the signal charges taken out of said light receiving elements to form an added signal charge, and obtaining a plurality of added signal charges for all said light receiving elements; and
    outputting the added signal charges as a video signal.

15. A method according to claim 14, wherein the step for taking out signal charges includes a step for shifting the light receiving elements to be read out by at least one into alternate fields.

* * * * *